United States Patent
Cecchi et al.

(10) Patent No.: US 7,313,303 B2
(45) Date of Patent: Dec. 25, 2007

(54) TELECOMMUNICATION CABLE COMPRISING A JOINTED OPTICAL CORE AND METHOD FOR JOINTING SAID CORE

(75) Inventors: Feliciano Cecchi, Inveruno (IT); Alessandro Ginocchio, Sesto San Giovanni (IT); Nunzio Romanini, Villongo (IT); Giovanni Brandi, Milan (IT)

(73) Assignee: Prysmian Cavi E Sistemi Energia S.R.L., Milan (IT)

( * ) Notice: Subject to any disclaimer, the term of this patent is extended or adjusted under 35 U.S.C. 154(b) by 0 days.

(21) Appl. No.: 10/532,718

(22) PCT Filed: Oct. 30, 2002

(86) PCT No.: PCT/EP02/12097

§ 371 (c)(1), (2), (4) Date: Jan. 9, 2006

(87) PCT Pub. No.: WO2004/040347

PCT Pub. Date: May 13, 2004

(65) Prior Publication Data

US 2006/0127013 A1    Jun. 15, 2006

(51) Int. Cl.
G02B 6/44 (2006.01)
G02B 6/255 (2006.01)

(52) U.S. Cl. .......... 385/103; 385/95; 385/96; 385/97; 385/98; 385/99; 385/100; 385/102; 385/107

(58) Field of Classification Search .......... 385/103
See application file for complete search history.

(56) References Cited

U.S. PATENT DOCUMENTS

| 4,367,917 | A | * | 1/1983 | Gray | 385/102 |
| 4,545,645 | A | * | 10/1985 | Mignien | 385/69 |
| 4,627,942 | A | | 12/1986 | Gagen et al. | |
| 4,657,343 | A | * | 4/1987 | Oldham et al. | 385/69 |

(Continued)

FOREIGN PATENT DOCUMENTS

WO    WO-94/18732    8/1994

(Continued)

OTHER PUBLICATIONS

Masaru; "Method of Jointing Plastic Insulated Cable"; Patent Abstracts of Japan, of JP 01-016209 A, Jan. 19, 1989.

(Continued)

*Primary Examiner*—Frank G. Font
*Assistant Examiner*—Ryan Lepisto
(74) *Attorney, Agent, or Firm*—Finnegan, Henderson, Farabow, Garrett & Dunner, L.L.P.

(57) ABSTRACT

An optical cable having an optical core with a strength member and optical fibers embedded in a thermoplastic material. The optical core has a joint section having substantially the same diameter as the one of the optical core. The joint section has a jointed strength member and a plurality of spliced optical fibers, the jointed portion of the strength member and the spliced portion of the optical fibers being embedded into a cured polymeric material. A method for manufacturing an optical core is also disclosed.

14 Claims, 3 Drawing Sheets

U.S. PATENT DOCUMENTS

| | | | | |
|---|---|---|---|---|
| 4,722,588 A | * | 2/1988 | Priaroggia | 385/69 |
| 4,784,459 A | | 11/1988 | Jenkins | |
| 4,842,438 A | | 6/1989 | Bortolin et al. | |
| 5,093,048 A | | 3/1992 | Kagan | |
| 6,351,589 B1 | * | 2/2002 | Leggett | 382/128 |
| 2001/0051030 A1 | * | 12/2001 | Hofner | 385/109 |

FOREIGN PATENT DOCUMENTS

| | | |
|---|---|---|
| WO | WO-00/60393 | 10/2000 |
| WO | 01/46080 A2 | 6/2001 |

OTHER PUBLICATIONS

Yukio; "Extrusion Mold Jointing Method for CV Cable"; Patent Abstracts of Japan, of JP 08-265932 A, Oct. 11, 1996.

* cited by examiner

TELECOMMUNICATION CABLE COMPRISING A JOINTED OPTICAL CORE AND METHOD FOR JOINTING SAID CORE

CROSS REFERENCE TO RELATED APPLICATION

This application is a national phase application based on PCT/EP2002/012097, filed Oct. 30, 2002, the content of which is incorporated herein by reference.

FIELD OF THE INVENTION

The present invention relates to a telecommunication cable comprising an optical core and to a respective method for jointing said optical core. In particular, the invention relates to a submarine telecommunication cable comprising a jointed optical core of the tight type.

BACKGROUND ART

An optical cable typically comprises an optical core incorporating a plurality of optical fibers for the transmission of optical signals and one or more external protective and/or reinforcing layers. The optical core, typically the one suitable for submarine applications, is advantageously of the "tight" type, which comprises a central support element and, around it, one or more layers of polymer material in which the optical fibers are embedded in a fixed position.

The manufacturing of an optical cable including a core of the tight type typically entails at least two steps. The first step relates to the manufacturing of the optical core and comprises the extrusion of at least one polymeric layer, which tightly embeds the optical fibers in a fixed position along a circumference around the central support element. The second step includes, either as a single step or as a plurality of separate steps, the provision of the various types of protecting layers around the optical core.

The manufacturing of a continuous length of an optical cable is generally limited by the maximum continuous manufacturing length of the optical core, which is in turn determined by the length capacity of the devices and apparatuses employed for manufacturing the optical core, e.g. the capacity of the bobbins for feeding the optical fibers. The maximum continuous manufacturing length of an optical core (referred to as a "section" of the optical core in the following) is typically of about 50 km and may arrive up to about 100 km in some particular cases. In addition, due to possible accidents during manufacturing of the optical core (e.g. breakage of the optical fibers), it may happen that even shorter lengths of optical core are produced, which are nevertheless worth to be employed for the manufacturing of an optical cable.

At present, two or more sections of the so produced optical core are then employed for manufacturing respective sections of an optical cable, which sections need then to be assembled together in order to obtain the desired lengths of cable to be installed (e.g. up to 300÷400 km for unrepeatered systems). This post-manufacturing assembling operation, carried out at the end of manufacturing process, is effected by means of a joint box, where the different elements of the optical cable are jointed together and which has generally much greater dimensions with respect to the cable, thus introducing an element of rigidity in the overall cable structure.

A submarine cable joint adapted for jointing ends of an optical submarine cable is disclosed for instance in U.S. Pat. No. 4,784,459.

The applicant has now found a method for jointing different sections of an optical core of the tight type, which method allows to obtain a jointed section having substantially the same diameter as the one of the optical core. The so obtained jointed core thus allows to manufacture substantial lengths of said cable without the need to introduce discontinuity elements in the structure of the cable, such as the jointing boxes.

SUMMARY OF THE INVENTION

An aspect of the present invention relates to a method for jointing a first section of an optical core for a telecommunication cable with a second section of an optical core of a telecommunication cable, said first and second optical cores having substantially a same predetermined diameter and respectively comprising a central strength member, a plurality of optical fibers and a thermoplastic polymeric material disposed around said strength member and embedding said optical fibers, wherein said method comprises:

removing the polymeric material for a predetermined length at one respective end of said first and of said second section, for exposing a respective portion of said two pluralities of optical fibers and of said two strength members;

splicing the respective exposed portions of said plurality of optical fibers and jointing the two exposed portion of the respective two strength members, thus obtaining a length of an assembly formed by said exposed spliced portions of optical fibers and by said exposed portion of jointed strength member;

providing a liquid radiation curable coating composition along the whole length of said assembly;

curing said radiation curable coating composition, in order to obtain an elongated element of a cured polymeric material embedding said optical fibers and said strength member, said elongated element having substantially the same diameter as the predetermined diameter of said first and second sections of the optical core.

According to a preferred embodiment, said coating composition is provided by means of a movable coating device, which is traversed along the length of said assembly from a first end to a second end thereof.

Another aspect of the present invention relates to an optical core for a telecommunication cable comprising a first section and a second section, said first and second sections having substantially a same predetermined diameter and respectively comprising a central strength member, a plurality of optical fibers and a thermoplastic polymeric material disposed around said strength member and embedding said optical fibers;

a third section, disposed between said first and second section and comprising a splicing between said plurality of optical fibers and a jointing between the strength members of said respective first and said second section;

wherein said third section comprises a cured polymeric material disposed around and embedding said jointed strength member and said spliced optical fibers, said third section having substantially the same diameter as the predetermined diameter of said first and second sections of the optical core.

A further aspect of the present invention relates to an optical cable comprising:

an optical core comprising a central strength member, a plurality of optical fibers and a thermoplastic polymeric material disposed around said strength member and embedding said optical fibers, said optical core having a predetermined outer diameter;

at least one protective layer disposed around the said optical core;

wherein said optical core comprises a joint section having substantially the same diameter as said predetermined diameter of the optical core, said joint section comprising a jointed portion of said strength member and a spliced portion of each of said optical fibers, the strength member and the optical fibers comprised in said joint section being embedded into a cured polymeric material.

In the present description and claims, the term "substantially the same diameter" when referred either to the diameter of a joint or to the diameter of a section of an optical core, as compared to the diameter of a (or another) section of an optical core, is intended to encompass any diameter which is either equal or few tenth of millimetres larger than the diameter of said (other) optical core. The difference shall be sufficiently low, in order to allow the application of the external protective layers (e.g. steel wires armouring) without any interference between optical core and protective layers in order to avoid damages of the optical core. The difference between the diameters is typically less than 0.3 mm, preferably less than 0.20 mm more preferably less than 0.15 mm.

DESCRIPTION OF THE INVENTION

Figure 1:
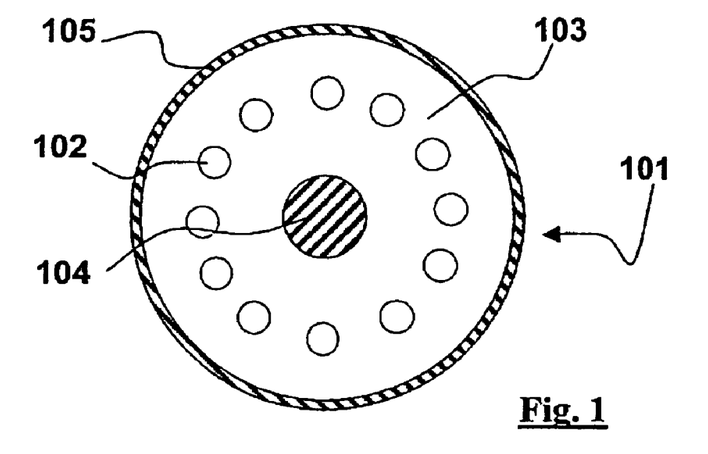
FIG. 1 shows a cross-sectional view of an optical core.

FIG. 1 shows a cross-sectional view of an example of an optical core 101 which may be suitably jointed according to the present method.

The optical core 101 comprises a central support, typically a central reinforcing member 104, coated with a thermoplastic polymeric layer 103. The central reinforcing member may be, for instance, a metal wire, e.g of steel. Examples of polymers suitable for coating the reinforcing member are thermoplastic resins such as an elastomeric polyester. For example, polymers marketed under the trade name Hytrel®, e.g. Hytrel® 3548L (Du Pont), can be used.

A plurality of optical fibres 102, with their respective coating layers (not shown), typically of acrylic resin, are arranged longitudinally around the strength member 104 and are completely encapsulated into the polymeric layer 103. The number of optical fibers may be, for instance, from 2 to 24, preferably 6 to 12.

According to a preferred embodiment, the strength member is a steel wire with a diameter of between 0.5 and 0.7 mm, preferably of about 0.65 mm.

The polymeric layer 103 encapsulating the optical fibres has a diameter of between 2.5 and 3 mm, preferably 2.75 mm.

The optical core may comprise a further protective layer 105 of a plastic material, e.g. a sheath of thermoplastic material having a thickness of about 0.05-0.15 mm. The thermoplastic material is selected from those known in the art including, though the list is by no means exhaustive, polyamide and polyethylene and polypropylene.

In order to joint two sections of an optical core 101 as depicted in FIG. 1 according to the method of the present invention, the sequence of operations can be as follows.

First of all, the thermoplastic polymeric material embedding the optical fibers and the strength member of the respective end portions of the two different sections is removed according to conventional techniques, e.g. by manual removal and/or by melting of the polymeric material. In order to allow an easy jointing operation, the optical fibers and strength member of each end are exposed for a length of from about 30 to about 70 cm, typically for about 50 mm.

Then, the exposed optical fibers and the strength member of the first section are jointed with the respective exposed optical fibers and strength member of the second section.

The strength member is jointed by any suitable conventional technique, for instance by means of a ferrule, e.g. a metal ferrule, preferably of stainless steel, which is crimped on the respective ends of the two strength members.

Optical fibers can be spliced together according to any suitable technique known in the art such as, for instance, fusing welding using any conventional splicing means. For instance, commercial automatic welder 40F from Fujikura can be used. The glass portion of the spliced optical fibers is then coated as known in the art, for instance by applying a UV curable coating composition of the type used for secondary coating optical fibers, by using a conventional recoating device. For instance, DeSolite® 950-111 from DSM can be applied as coating material, by using a Ericsson EFR 1000 recoater.

Whilst it is preferable to first splice the plurality of optical fibers before proceeding with the jointing of the strength members, also the reverse order of splicing/jointing can be followed. The splicing/jointing step should however preferably result into a fiber length deficiency with respect to the length of the strength member, for avoiding possible fibers displacement during the application of the coating material. This means that the resulting length of the spliced optical fibers is slightly shorter than the length of the jointed strength member, so that the fibers are subjected to a slight tension. Typically, the length of the spliced optical fibers is from about 0.01% to about 0.1% less than the length of the jointed strength member.

Figure 2:
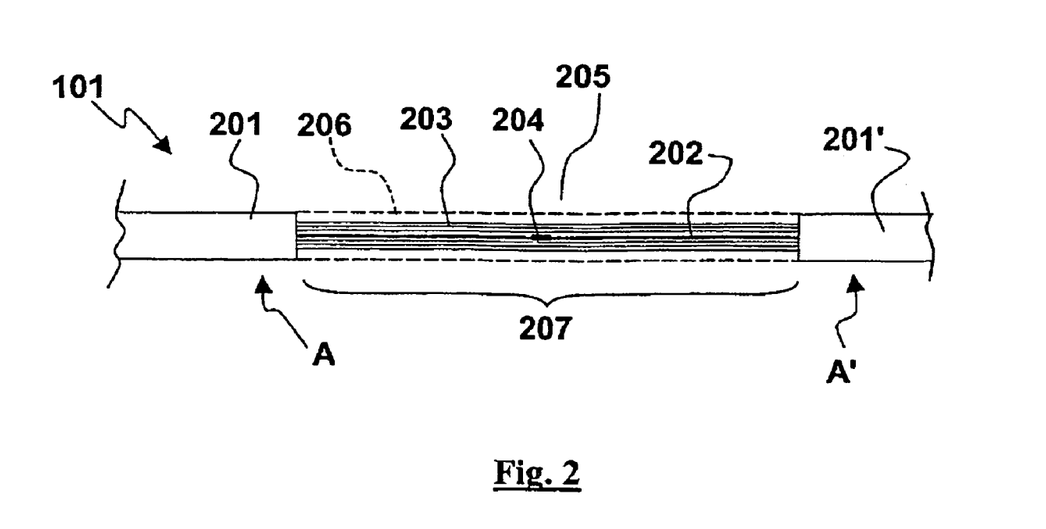
FIG. 2 shows two jointed sections of an optical core before coating of the same.

FIG. 2 shows the two jointed sections A and A' of an optical core after the above operations, before the application of a polymeric coating 206 (represented by a dashed line) for completing the joint according to the method of the present invention. As shown in FIG. 2, after the above splicing and jointing operations have been terminated, the respective end portions 201 and 201' of the two sections of the optical core are connected to each other through assembly 205 consisting of the respective exposed portions of the jointed strength member 202 (illustrated also with the crimped stainless steel ferrule 204 used for the jointing) and of the spliced optical fibers 203. Assembly 205 and polymeric coating 206 thus define a joint section 207 of the optical core 101.

The length of the exposed plurality of optical fibers 203 and of the strength member 202 is of about 80-120 cm.

The liquid curable composition to be applied on the exposed fibers and strength member to form the polymeric coating 206 should preferably have, at the application temperature, typically 25° C., a viscosity sufficiently high in order to avoid dripping phenomena during its application. On the other side, said viscosity should not be excessively high, in order to allow the composition to suitably flow through the conduits of the application device and to completely embed fibers and strength member. Preferably, said coating composition will thus have a viscosity at 25° C. of at least 1 Pas, more preferably of at least 5 Pas. Said viscosity is preferably not higher than 100 Pas, more preferably not higher than 50 Pas. According to a preferred embodiment, said viscosity is of about 10 Pas. Said viscosity is measured by means of a Bohlin viscometer in a plate-plate configuration, 40 mm diameter, shear rate 1 $s^{-1}$.

Typically, the liquid curable composition to be applied on the exposed fibers and strength member is an acrylic based coating composition comprising at least one oligomer with acrylate or methacrylate terminal groups, at least one acrylic diluent monomer and at least one photoinitiator.

The oligomer represents generally 40-80% of the formulation by weight and can be, for instance a polyurethane-acrylate, an epoxyacrylate or mixtures thereof.

The acrylic type diluent monomer represents 20-50% and has a structure compatible with that of the oligomer. The diluent monomer can contain an alkyl structure, such as isobornylacrylate, hexanediacrylate, dicyclopentadiene-acrylate, trimethylolpropane-triacrylate, or aromatic such as nonylphenyletheracrylate, polyethyleneglycol-phenylether-acrylate and acrylic derivatives of bisphenol A.

One or more photoinitiators, such as those commonly known in the art, are preferably added to the composition. Further additives, such as inhibitors inhibiting polymerization by the effect of temperature, light stabilizers, levelling agents and detachment promoters can also be added.

A typical formulation of a curable coating composition comprises about 40-70% of polyurethaneacrylate, epoxy-acrylate or their mixtures, about 30-50% of diluent monomer, about 1-5% of photoinitiator and about 0.5-5% of other additives.

Once cured, the polymeric coating has preferably a modulus of elasticity E' at 25° C. comparable to the one of the polymeric material forming the optical core. Preferably, said modulus is not lower than about ⅓ of the modulus of the thermoplastic material, more preferably not lower than about ½ of said modulus. Furthermore, the modulus of the cured polymeric coating is preferably not higher than about five times the modulus of the thermoplastic material, more preferably not higher than about three times. For instance, when the material forming the optical core is a thermoplastic polymer having a modulus of elasticity of about 30 MPa at 25° C. (such as Hytrel® 3548L), the modulus of elasticity at 25° C. of the cured polymeric material forming the joint can be from about 10 MPa to about 150 MPa, preferably from about 20 to about 90 MPa. In case the jointed optical core is employed for manufacturing a submarine telecommunication cable, typically having an operating temperature range from 0° C. to about 20° C., it is preferable that said modulus of elasticity remains lower than about 1000 MPa along the whole of said temperature range, more preferably lower than about 800 MPa and much more preferably not higher than about 600 MPa.

The above modulus of elasticity is the tensile modulus of the material as measured using a DMTA apparatus (Dynamic Mechanical Thermal Analyser from Reometrics Inc.), in traction, at a frequency of 1 Hz and at a heating rate of 2° C./min.

An example of a liquid curable coating composition suitable for being used in the method and joint of the present invention is DeSolite® 3471-9-41 (DSM).

Figure 3:
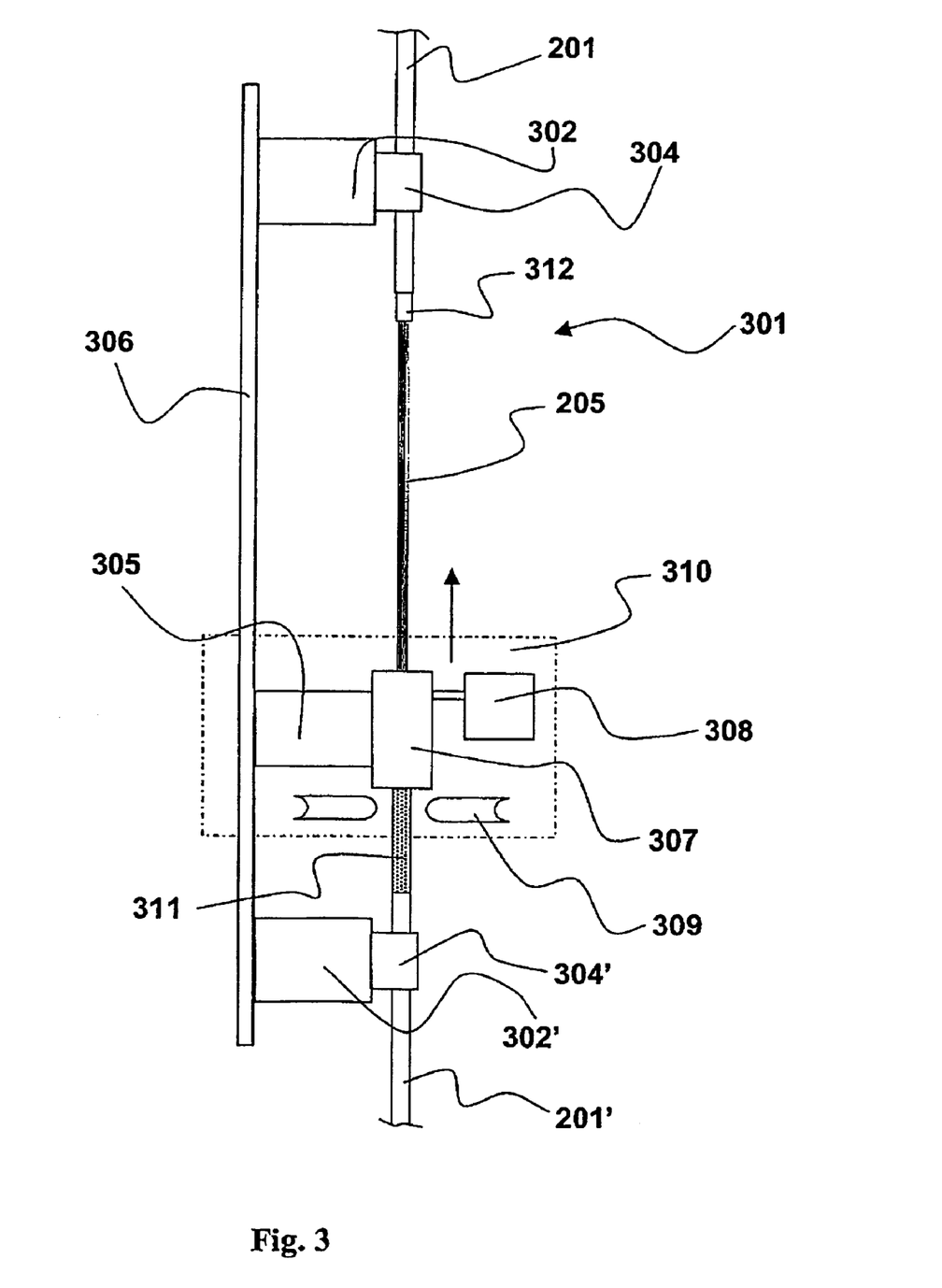
FIG. 3 shows an apparatus for performing the method of the invention.

FIG. 3 shows an apparatus 301 suitable for performing a jointing method and to obtain a jointed optical core according to the invention. In particular, the present method advantageously results into a joint having substantially the same diameter of the optical core.

Said apparatus 301 is preferably mounted in a vertical position and comprises a pair of tensioning elements 302 and 302', each of which is provided with a respective fixing element 304 and 304', for fixing the jointed optical core.

The apparatus also comprises a movable coating device 310 for forming the joint. The coating device comprises a carriage 305 which can slide on a guide 306 ending in correspondence with the pair of tensioning elements 302 and 302'. The said guide is preferably a very high-precision slide (the error of parallelism between the supporting plane and the plane on which the carriage slides is not more than ±5 μm) with a length of approximately 2 m.

A mould 307 (illustrated in more detail in FIGS. 4 and 5), is positioned on the said carriage 305. The mould is connected to a dispenser 308 for the radiation curable coating composition. Ultraviolet (UV) lamps 309 are arranged on opposite sides in the proximity of the mould 307 and are preferably integral with the carriage 305.

The carriage 305 is suitably driven by a motor (not shown) and is moved along the guide 306, preferably at a controlled speed, from one end to the other of the portion of fibers and strength member to be coated. Preferably, the carriage is moved by means of an endless screw driven by an external motor. The endless screw rotates about itself and causes the movement of the carriage. The said motor is advantageously a very high-precision motor which does not cause vibrations, provides a constant speed, and reaches the working speed with a constant acceleration when starting and stopping. The value of the acceleration can be preset. The said characteristics of the motor avoid vibrations or abrupt movements which might adversely affect the quality of the coating. Depending on the Theological properties of the liquid coating composition (e.g. its viscosity), the mould is preferably moved along the elements to be coated at a speed of from about 0.1 to about 1.5 m/min, more preferably from about 0.3 m/min to about 1.0 m/min.

Figure 4:
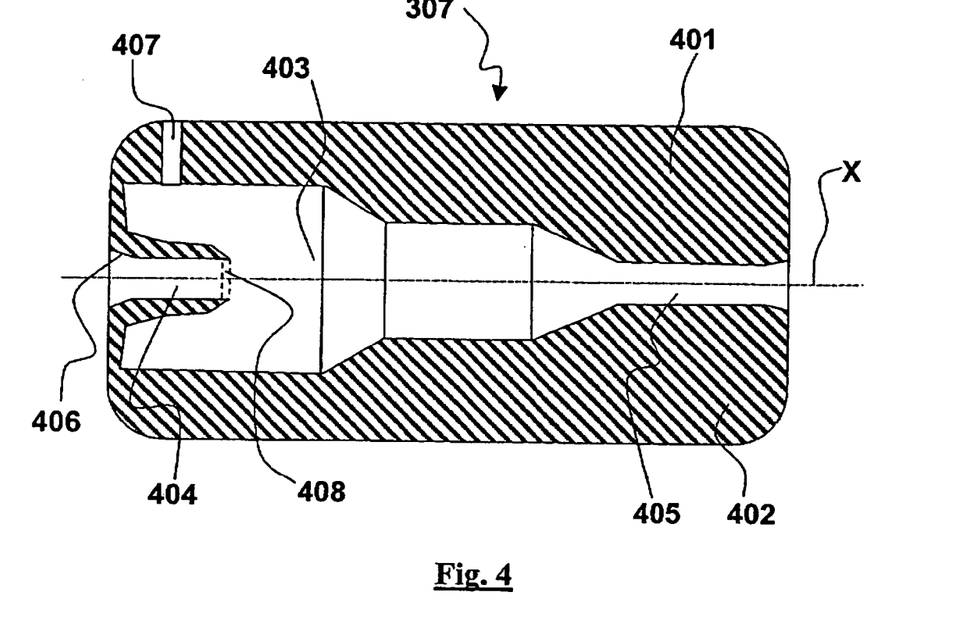
FIG. 4 shows a detail of the mould of the apparatus of FIG. 3.

FIG. 4 shows in detail the mould 307, comprising two halves 401 and 402, which are preferably complementary to each other in such a way that they can be placed in contact one to each other to form a longitudinal internal cavity, through which the assembly of the strength member and optical fibers is then caused to pass through during the coating process. The central area of the cavity includes a chamber 403 with a cylindrical cross section for the accumulation of the material forming the coating, an entry channel 404 with a circular cross section for the insertion of the optical fibers and strength member, and an exit channel 405 with a circular cross section through which the coated optical fibers and strength member emerge.

The mould also comprises a channel 407 which introduces the liquid material (provided by the dispenser 308 shown in FIG. 3) into the accumulation chamber.

Each of the two halves is preferably made from metallic material, or more generally from a material which is practically non-deformable at high temperatures and is capable of preventing the entry of ultraviolet light into the mould.

Entry and exit channels 404 and 405 are coaxial to a same axis, identified by the letter X in FIG. 4, in such a way that the assembly of the optical fibers and strength member is kept in a substantially rectilinear position. The entry channel 404 has preferably a diameter substantially equal (i.e. equal or up to about 0.2 mm larger) to the diameter of the optical core, while the exit channel 405 has a diameter slightly larger than the diameter of the optical core, preferably from about 0.1 to about 0.3 mm larger, in order to allow an overcoating of the integral portion of the optical core. The entry channel 404 has also a flare 406 which facilitates the insertion of the assembly 205 into the mould, so to avoid an abrupt positioning of the fibers which might cause damage to, or even fracture of, the fibers. In the same manner, also the exit channel 405 may be provided with a similar flare, in order to allow a smooth release of the coated assembly from the mould.

The device shown in FIG. 3 operates in the following way.

A jointed optical core (e.g. the one illustrated in FIG. 2) is positioned into the device by fixing the two integer end portions 201 and 201' on the tensioning elements 302 and 302' through the respective fixing elements 304 and 304'. Once the optical core has been fixed, the tensioning elements are moved apart, so that the jointed strength member (and, accordingly, also the spliced optical fibers) of the assembly 205 remains under a slight tension during the coating process. Typically, a tension of from about 5 kg to about 10 kg is applied to the optical core, so that the strength member is subjected to an elongation of about 0.05-0.1%. In case the optical core has an outer sheath, as the sheath 105 illustrated in FIG. 1, a length of about 10-20 mm of said sheath can advantageously be removed, in order to expose the thermoplastic material embedding the optical fibers. Accordingly, the final portion of the fixed optical core 312 has a slightly reduced diameter, which facilitates the application of the coating material at the interface between the assembly 205 to be coated and the final portion of the integral optical core.

The carriage 305 is placed at one end of the guide 306. A first half of the mould is placed on the said carriage in such a way that the assembly 205 is positioned exactly along the axis X. The second half of the mould is placed in contact with the first half to form the complete mould. In this condition, the assembly is inserted fully into the mould, and the liquid material is released by the dispenser 308 and passes through the channel 407 into the accumulation chamber 403 inside the mould, filling it completely. At the exit from the mould 307, the coating material is subjected to radiation curing by means of the two UV lamps 309, thus obtaining a joint having substantially the same diameter as the one of the optical core.

FIG. 3 illustrates a first portion 311 of the assembly 205 which has already been coated by coating device 310, which is moved in the direction of the arrow. At both interfaces between the assembly and the two final portions of the two integral optical cores, the coating material is preferably superposed for a length of about 10-20 mm and a thickness of about 0.05-0.1 mm to the integral optical core. This slight superposition of the coating material onto the integral optical core allows to fasten the coating material to the optical core and to avoid a possible coating discontinuity at the interfaces.

According to an embodiment of the present invention, a disk-like element, indicated by number 408 in FIG. 4, having a plurality of holes for passing-through of fibers and strength member, can be inserted along the entry channel 404, in order to avoid a possible displacement of the optical fibers and/or the strength member from their respective rectilinear position (e.g. because of the pressure caused by the liquid material in the accumulation chamber of the mould), thus contributing to maintaining the desired spatial configuration of the optical fibers around the central strength member. This disk may be advantageously obtained by cutting a transversal section (e.g. 2-3 mm thickness) from the integral optical core, e.g. by cutting the end of one of the two integral optical cores after jointing of the same. The so obtained disk, preferably deprived from the outer covering layer, is then caused to slide away from the integral end of the optical core and positioned within the mould, together with the assembly to be coated, in correspondence with the exit portion of the entry channel 404, as indicated by number 408 in FIG. 4. When the mould, at the end of the coating process, reaches the end of the opposite section of the integral optical core, the disk rests in contact with said integral portion and is coated by the coating material from the mould.

Figure 5:
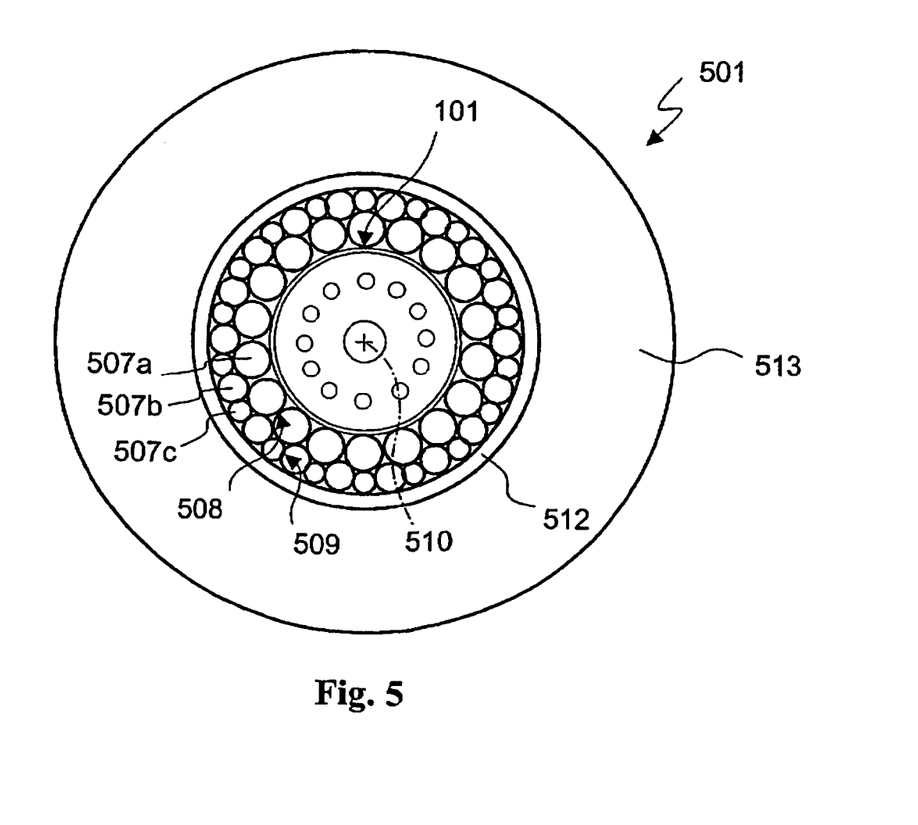
FIG. 5 shows an example of a submarine telecommunication cable.

The so obtained jointed optical core can thus be used to manufacture a substantial length of an optical cable, such as the cable 501 illustrated in FIG. 5.

The cable 501 has an axis 510 and comprises centrally the optical core 101 which is substantially cylindrical and, around it, a plurality of protective and reinforcing elements or layers 507, 512 and 513.

The optical core 101, described in detail above with reference to FIG. 1 and jointed according to the above illustrated method, has an external diameter which is preferably less than 4 mm, typically of about 3 mm.

A plurality of reinforcing elements 507a, 507b and 507c, preferably strand-like elements made of steel, are provided around the optical core 101. In the example shown in FIG. 5, this plurality of reinforcing elements comprises:

a first group of reinforcing elements 507a having a first diameter and arranged in mutual contact so as to provide a self-supporting structure which defines a first reinforcing layer 508 outside the optical core 101;

a second group of reinforcing elements 507b having a second diameter which is smaller than that of the first group and arranged outside the elements of the first group 507a; and a third group of reinforcing elements 507c which have a third diameter smaller than that of the second group and are arranged outside the elements of the first group 507a and alternated with the elements of the second group 507b so as to define, together with the latter, a second reinforcing layer 509 outside the reinforcing layer 508.

The reinforcing elements 507c are arranged in an angular position corresponding to that of the reinforcing elements 507a so that the second reinforcing layer 509 has a substantially cylindrical external envelope tangential both to the reinforcing elements 507b and to the reinforcing elements 507c.

The assembly consisting of the two reinforcing layers 508 and 509 defines a structure known in the art as a "Warrington" structure.

A tubular lining 512, which is preferably made of metallic material and more preferably of copper, surrounds the reinforcing elements 507b, 507c of the second reinforcing layer 509 and, together with the abovementioned "Warrington" structure, defines a reinforcing structure having mechanical characteristics such as to provide the cable 501 with a high resistance to mechanical stresses, in particular to the hydrostatic pressure present in deep sea zones. Moreover, the lining 512 defines an electrically conductive element which can be used for electrically supplying signal repeaters arranged in the telecommunications system of which the cable 501 forms a part. Finally, the lining 512 allows the innermost part to be protected from moisture.

Alternatively, the reinforcing elements may be arranged in other configurations, i.e. in one or more rows, depending on the conditions of use.

The cable 501 comprises, moreover, a layer 513 of polymer material, preferably polyethylene, which is arranged outside the lining 512 and designed to provide an electrical insulation with respect to the exterior.

Where further linings are not present, the external diameter of the layer 513 also defines the external diameter of the cable 501. The layer 513 may, if necessary, be protected by a metal-strip lining (not shown) or by one or more linings of the polymer type (not shown) outside the metal-layer lining.

The cable 501 described above is typically designed to be used up to a maximum depth, at sea, of about 7000 m. In some cases, for example when used in shallow seawater where fishing activities are performed, the cable 501 may be provided with an external armouring (not shown) consisting of one or more layers of cylindrical reinforcing elements which are preferably made of steel and alternated with layers of polymer material, for example polypropylene.

The invention claimed is:

1. An optical cable comprising:
    an optical core comprising a central strength member, a plurality of optical fibers and a thermoplastic polymeric material disposed around said strength member and embedding said optical fibers, said optical core having a pre-determined outer diameter; and
    at least one protective layer disposed around said optical core; wherein said optical core comprises a joint section having substantially the same diameter as said predetermined diameter of the optical core, said joint section comprising a jointed portion of said strength member and a spliced portion of each of said optical fibers, the strength member and the optical fibers in said joint section being embedded into and completely encapsulated by a cured polymeric material.

2. The optical cable according to claim 1, wherein said cured polymeric material has a modulus of elasticity not lower than about ⅓ of the modulus of elasticity of said thermoplastic material.

3. The optical cable according to claim 1 wherein said cured polymeric material has a modulus of elasticity not lower than about ½ of the modulus of elasticity of said thermoplastic material.

4. The optical cable according to claim 1, wherein said cured polymeric material has a modulus of elasticity not greater than about five times the modulus of elasticity of said thermoplastic material.

5. The optical cable according to claim 1, wherein said cured polymeric material has a modulus of elasticity not greater than about three times the modulus of elasticity of said thermoplastic material.

6. An optical core for a telecommunication cable comprising:
    a first section and a second section, said first and second sections having substantially a same predetermined diameter and respectively comprising a central strength member, a plurality of optical fibers and a thermoplastic polymeric material disposed around said strength member and embedding said optical fibers; and
    a third section disposed between said first and second section and comprising a splicing between said plurality of optical fibers and a jointing between the strength members of said respective first and said second section;
    wherein said third section comprises a cured polymeric material embedding and completely encapsulating said jointed strength member and said spliced optical fibers, said third section having substantially the same diameter as the predetermined diameter of said first and second sections of the optical core.

7. A method for jointing a first section of an optical core for a telecommunication cable with a second section of an optical core of a telecommunication cable, said first and second optical cores having substantially a same predetermined diameter and respectively comprising a central strength member, a plurality of optical fibers and a thermoplastic polymeric material disposed around said strength member and embedding said optical fibers, wherein said method comprises:
    removing the polymeric material for a predetermined length at one respective end of said first and of said second section, for exposing a respective portion of said two pluralities of optical fibers and of said two strength members;
    splicing the respective exposed portions of said plurality of optical fibers and jointing the two exposed portions of the respective two strength members, thus obtaining a length of an assembly formed by said exposed sliced portions of optical fibers and by said exposed portions of jointed strength members;
    providing a liquid radiation curable coating composition along the whole length of said assembly; and
    curing said radiation curable coating composition in order to obtain an elongated element of a cured polymeric material embedding and completely encapsulating said optical fibers and said strength member, said elongated element having substantially the same diameter as the predetermined diameter of said first and second sections of the optical core.

8. The method according to claim 7, wherein said coating composition is provided by means of a movable coating device, which is traversed along the length of said assembly from a first end to a second end thereof.

9. The method according to claim 7, wherein said coating composition has a viscosity at 25.degree. C. of at least 1 Pas.

10. The method according to claim 7, wherein said coating composition has a viscosity at 25.degree. C. of at least 5 Pas.

11. The method according to claim 7, wherein said coating composition has a viscosity at 25.degree. C. not higher than 100 Pas.

12. The method according to claim 7, wherein said coating composition has a viscosity at 25.degree. C. not higher than 50 Pas.

13. The method according to claim 7, wherein the length of the spliced optical fibers is from about 0.01% to about 0.1% less than the length of the strength member.

14. The method according to claim 7, wherein the length of the assembly is from about 80 cm to 120 cm.

* * * * *

UNITED STATES PATENT AND TRADEMARK OFFICE
CERTIFICATE OF CORRECTION

PATENT NO. : 7,313,303 B2
APPLICATION NO. : 10/532718
DATED : December 25, 2007
INVENTOR(S) : Cecchi et al.

It is certified that error appears in the above-identified patent and that said Letters Patent is hereby corrected as shown below:

Claim 1, column 9, line 20, "pre-determined" should read --predetermined--.

Claim 9, column 10, line 41, "25.degree. C." should read --25°C--.

Claim 10, column 10, line 43, "25.degree. C." should read --25°C--.

Claim 11, column 10, line 46, "25.degree. C." should read --25°C--.

Claim 12, column 10, line 49, "25.degree. C." should read --25°C--.

Signed and Sealed this

Seventeenth Day of June, 2008

JON W. DUDAS
*Director of the United States Patent and Trademark Office*